Dec. 2, 1924.

H. HACKETT 1,518,064

MACHINE FOR LINING BOXES

Filed Oct. 29, 1923      14 Sheets-Sheet 1

Inventor
H. Hackett
By Marks & Clerk
Attys.

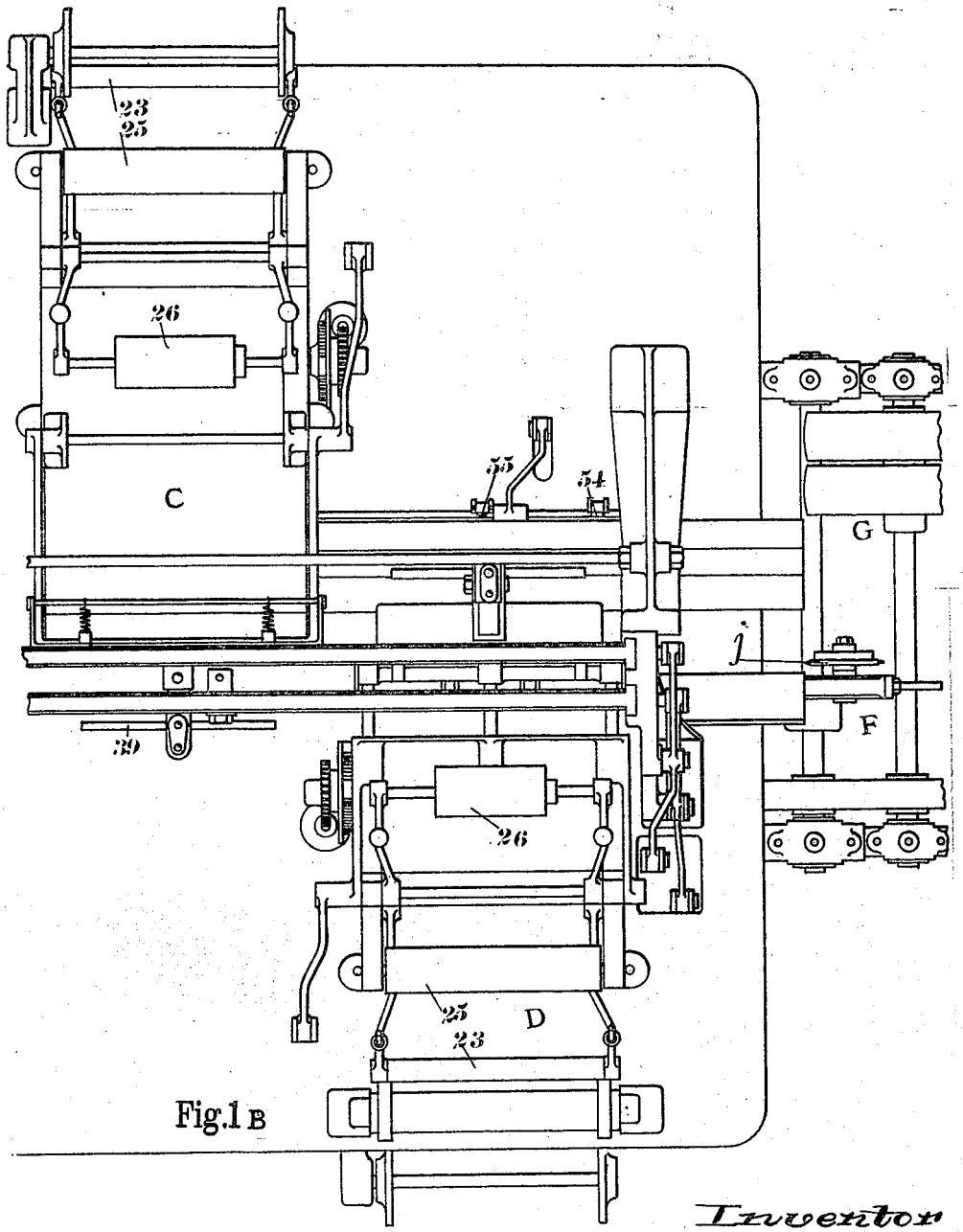

Dec. 2, 1924.

H. HACKETT

MACHINE FOR LINING BOXES

Filed Oct. 29, 1923    14 Sheets-Sheet 3

1,518,064

Inventor
H. Hackett
By Marks & Clerk
Attys.

Dec. 2, 1924.

H. HACKETT 1,518,064

MACHINE FOR LINING BOXES

Filed Oct. 29, 1923    14 Sheets-Sheet 4

Inventor
H. Hackett
By Marks & Clerk
Attys.

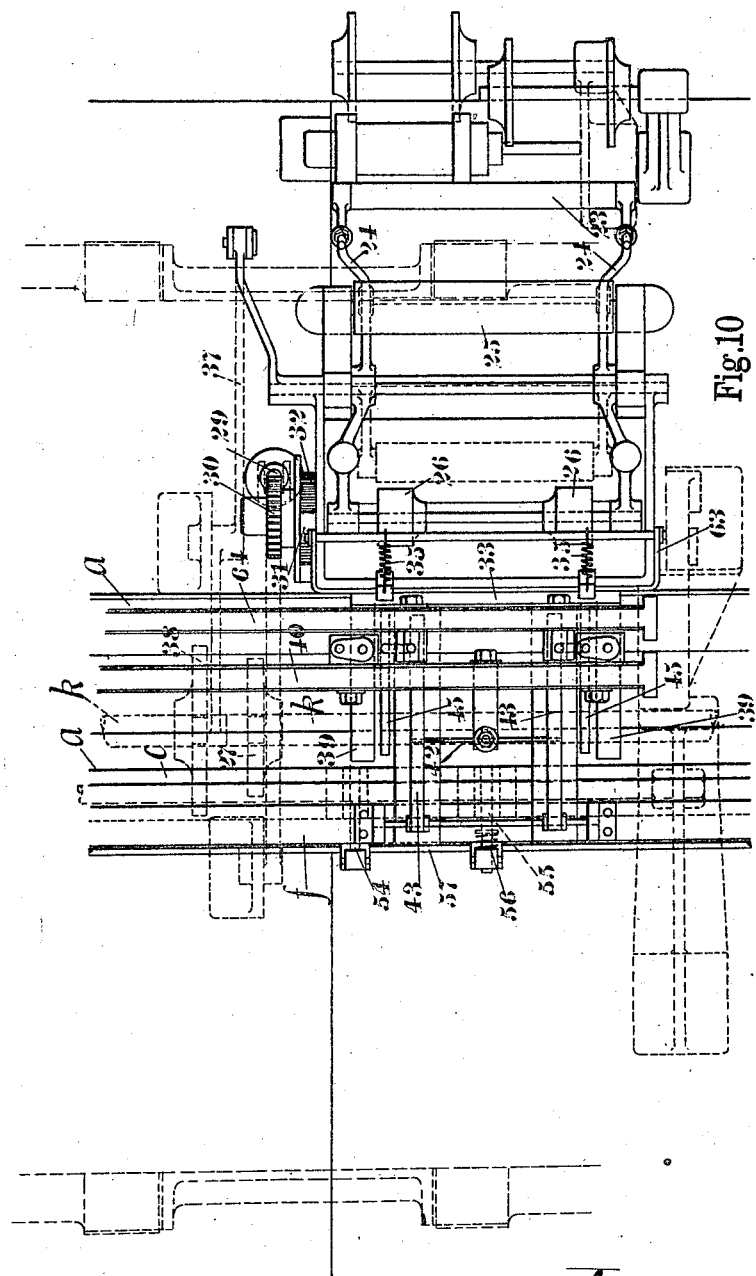

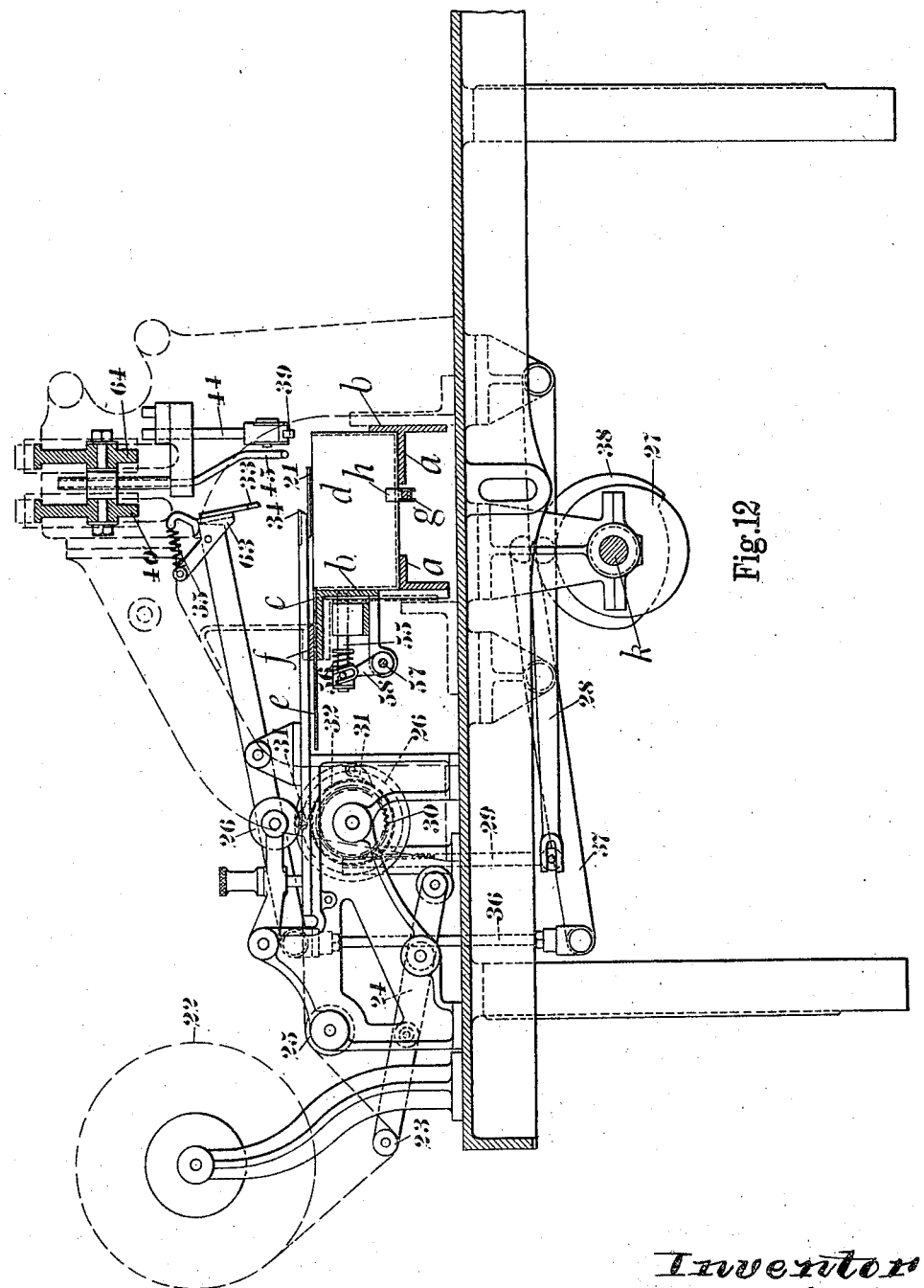

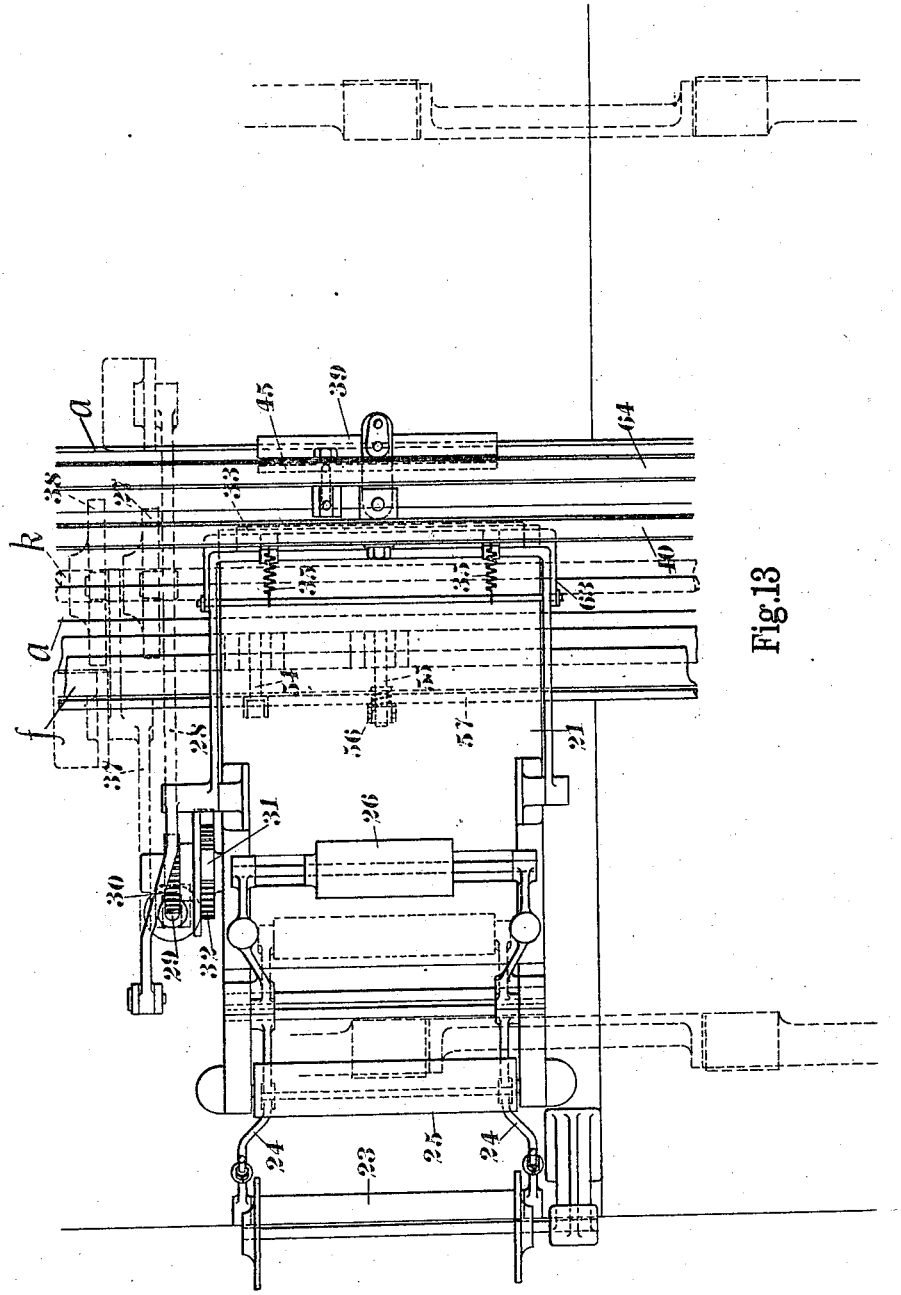

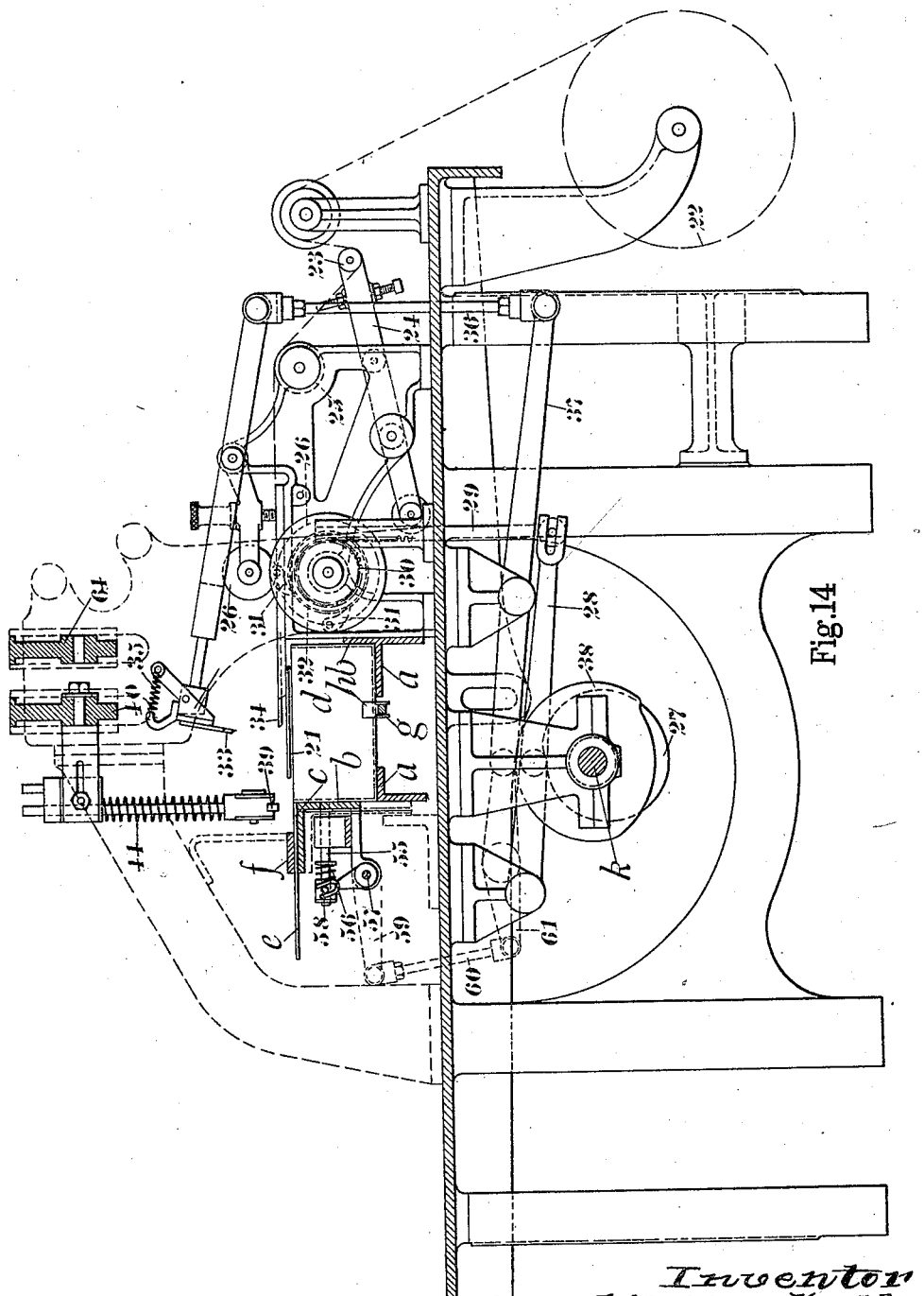

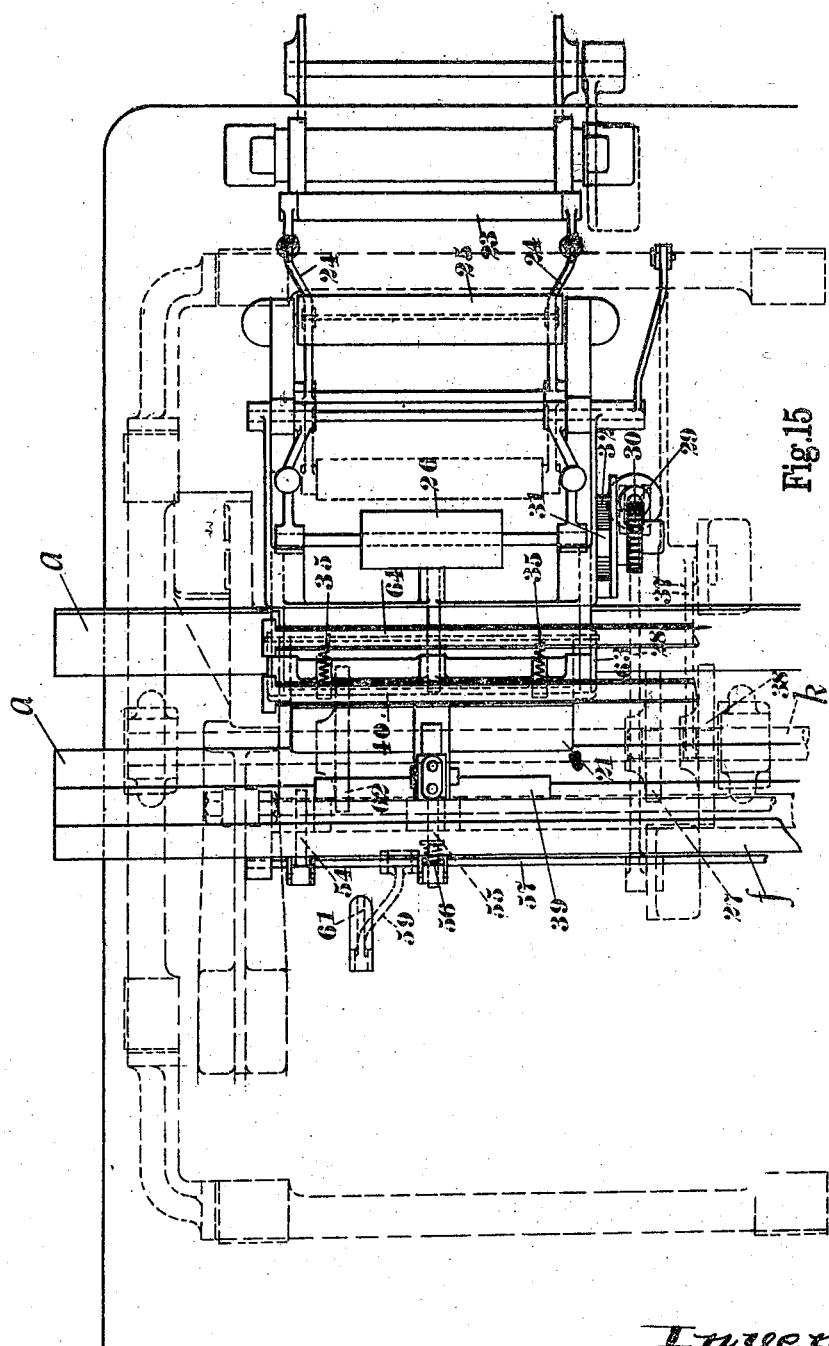

Patented Dec. 2, 1924.

1,518,064

UNITED STATES PATENT OFFICE.

HENRY HACKETT, OF BIRMINGHAM, ENGLAND, ASSIGNOR OF ONE-HALF TO CADBURY BROTHERS LIMITED, OF BIRMINGHAM, ENGLAND.

MACHINE FOR LINING BOXES.

Application filed October 29, 1923. Serial No. 671,586.

*To all whom it may concern:*

Be it known that I, HENRY HACKETT, a British subject, residing at 85 Elm Road, Bournville, in the city of Birmingham, England, have invented certain new and useful Improvements Relating to Machines for Lining Boxes, of which the following is a specification.

This invention relates to machines for lining wood or other boxes with papers or other like material. Ordinarily each of the upper edges of a box has attached to it by gum or glue a strip of paper, and the latter is caused to lie loosely over and cover the adjacent inner surface of the box and also, if desired, a portion of the bottom, the operations of attaching and placing the strips being carried out by hand.

The object of the present invention is to enable loose lining strips to be attached to a box and placed in position automatically.

The invention comprises the employment of means whereby the box is carried through a succession of operations, in the first of which adhesive is applied to the parts to which the lining is to be attached, the strips being applied in one or more subsequent operations.

For traversing the box through the different stages, the invention comprises the use of an intermittently moving endless chain or conveyor.

For applying adhesive to the box the invention comprises a roller, a horizontal carriage and guides by which the roller can be moved from a position at which adhesive is supplied to it to another at which the roller deposits the adhesive on the box, and means for sliding the carriage on the guides.

For applying the lining strips to the box, the invention comprises means for feeding each paper or like strip into position from a roll, severing the strips into pieces of proper length, and supporting the severed portions, together with means for pressing the strip portions on to the adhesive material on the box, and also (when required) means for folding the strip portions into position within the box.

In the fourteen accompanying sheets of explanatory drawings:—

Figures 1$^A$ and 2$^A$ are a plan illustrating the general arrangement of a machine constructed in accordance with this invention.

Figure 8$^a$ illustrates a detail which is obscured in Figure 8.

Figure 11 is a diagrammatic front view illustrating the operation performed by the mechanism shown in Figures 8-10.

Figures 12 and 13 are respectively sectional end elevation and plan of the mechanism for attaching a strip to the front edge of the box.

Figure 14 is a sectional end elevation, and Figure 15 a plan showing the mechanism for attaching a strip to the rear edge of the box, or the adjacent portion of the hinged lid.

In the construction of a machine as shown for applying loose paper linings to wood or like boxes fitted with hinged lids, the machine is provided with a longitudinal channel for the support of the boxes during their transition through the machine. This channel is formed mainly by a pair of bars $a$, and is provided with suitable side pieces $b$, and a horizontal support $c$ on which the lid of the box rests in the open position. The body of the box is indicated by $d$ and the open lid by $e$. Another bar $f$ over the part $c$ serves to hold the lid down on the support c during the transition of the boxes through the successive lining operations.

Figure 2:
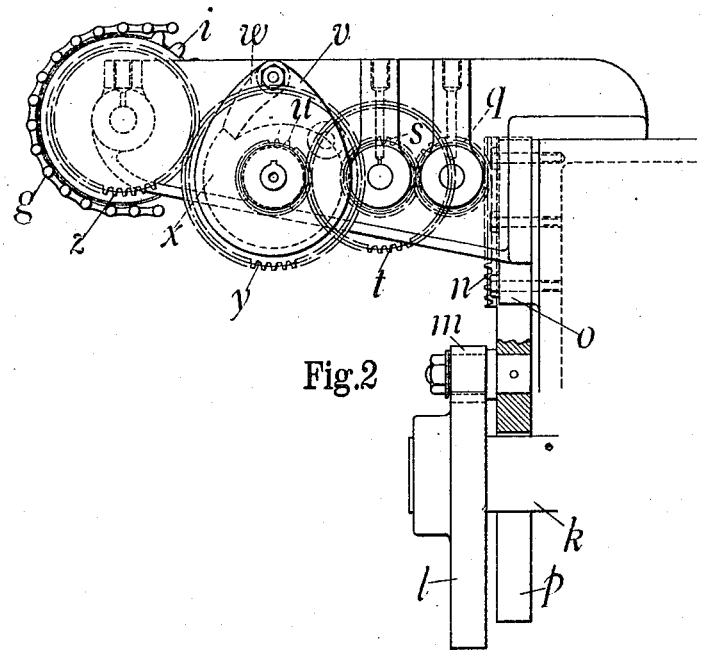
Figure 2 is a front elevation, Figure 3 an end elevation, and Figure 4 a plan of the mechanism for intermittently actuating the box conveyor chain.
Figure 3:
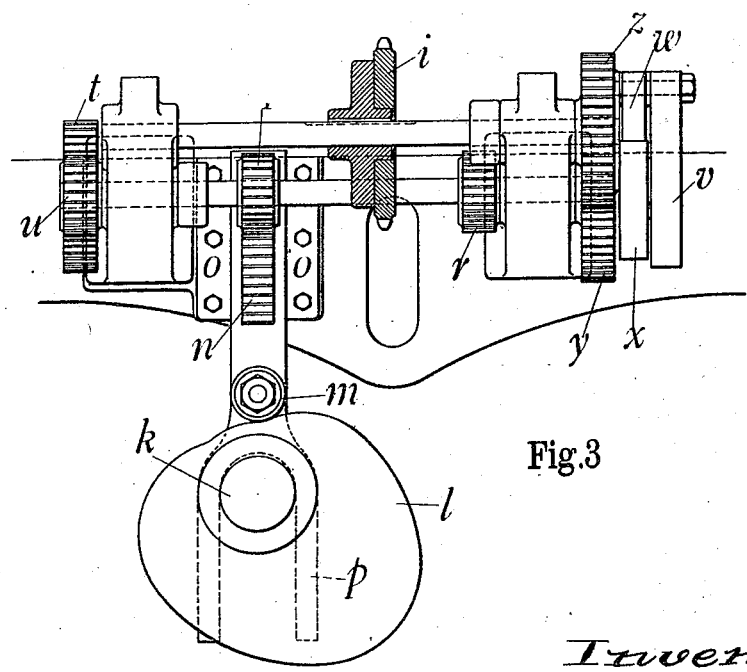
Figure 4:
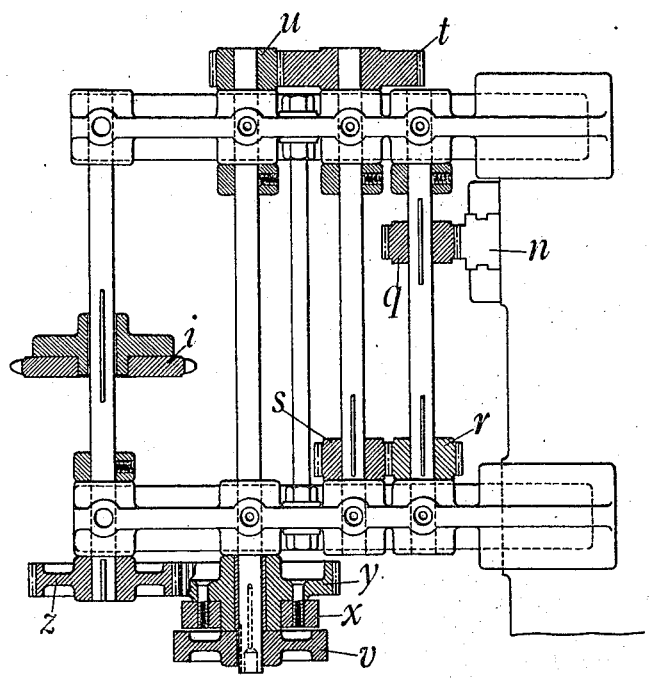
Figure 5:
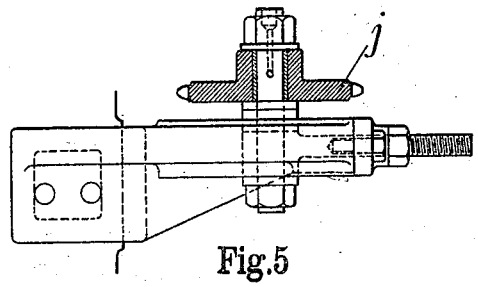
Figure 5 is a plan of a tensioning device in conjunction with the guide pulley at the end of chain remote from the driving mechanism shown in Figures 2-4.

The boxes are traversed along the channel by a conveyor chain g, provided with pawls or push pieces h; one of the latter presses against one end of each box and so serves to transmit motion from the chain to the box. The chain is carried by end sprockets or pulleys i, j, and is supported at intermediate positions by suitable rollers. Tensioning of the chain is effected by the screw operated adjustment mechanism shown in Figure 5. Intermittent operation of the chain through the medium of the sprocket i is effected by the mechanism shown in Figures 2–4. On the main shaft k of the machine is provided a cam l which through a roller m can produce vertical reciprocatory motions of a rack n. The rack is supported by the guides o and the forked lower extension p, the latter being arranged to abut against opposite sides of the shaft k. Motion is imparted from the rack n to the pinion q, and this motion is transmitted through pinions r, s, t, u, to a disc v carrying a pawl w co-operating with a ratchet or cam x. The pawl w imparts motion only in one direction to the cam x, and this motion is transmitted from the cam through the wheels y, z to the sprocket i, the amount of motion imparted to the sprocket i in each actuation being sufficient to carry each box from one stage to the next.

After a box has been placed on the machine it is first moved to the gumming position, where gum, glue, or any other suitable adhesive is applied to the edges or parts to which the paper strips are to be attached. The gumming is effected by the mechanism shown in Figures 6, 7. Alongside the longitudinal channel in which the box is located is arranged a tank 2 containing the adhesive material, and in this tank are mounted rollers 3, 4. These are connected by gear wheels 5, and one of them receives motion through a belt 6 from a pulley 7 on the constantly rotating shaft k. The roller 3 is the feed roller, the roller 4 serving to remove from the surface of the roller 3 excess of adhesive material. Transference of adhesive from the roller 3 to the box is effected by a roller 8. This is suspended by stems 9 from a carriage 10 provided with rollers 11 which can travel on a pair of fixed parallel guide bars 12. The carriage is actuated intermittently by a link 13, lever 14, rod 15 and lever 16, the latter receiving motion in one direction from a cam 17 on the shaft k, through a roller 18, the return motion being produced by a spring 19.

Figure 6:
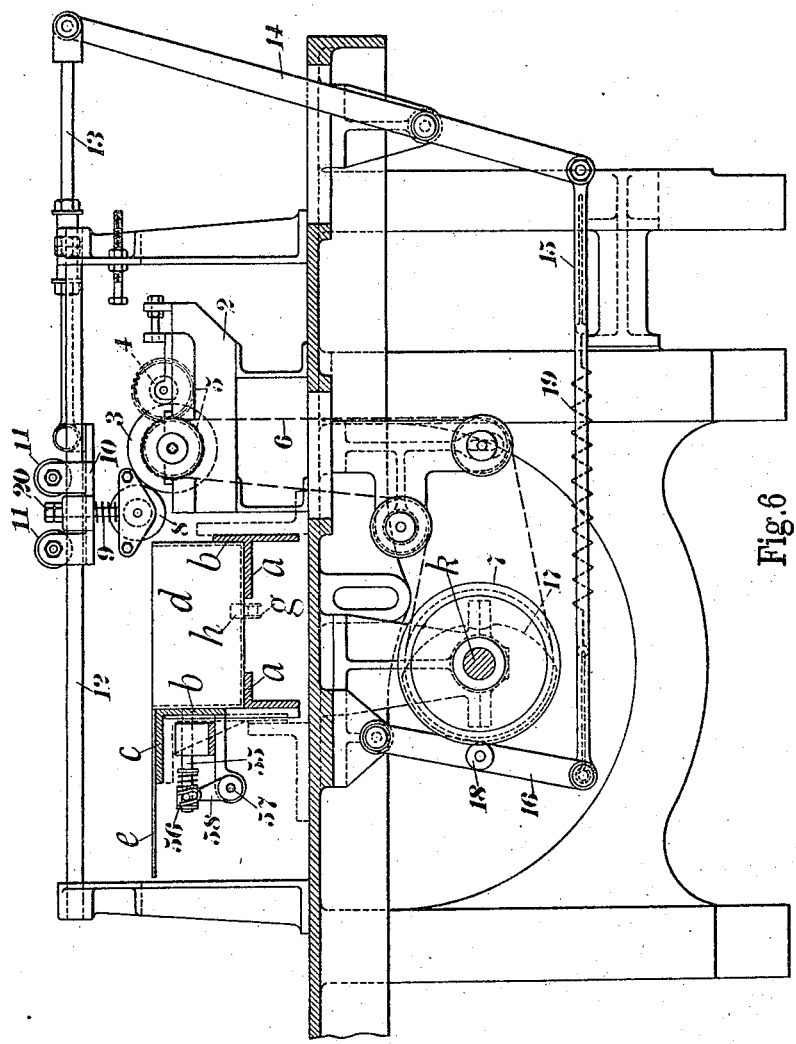
Figures 6 and 7 are respectively sectional end elevation and plan of the means whereby adhesive is applied to the boxes.
Figure 7:
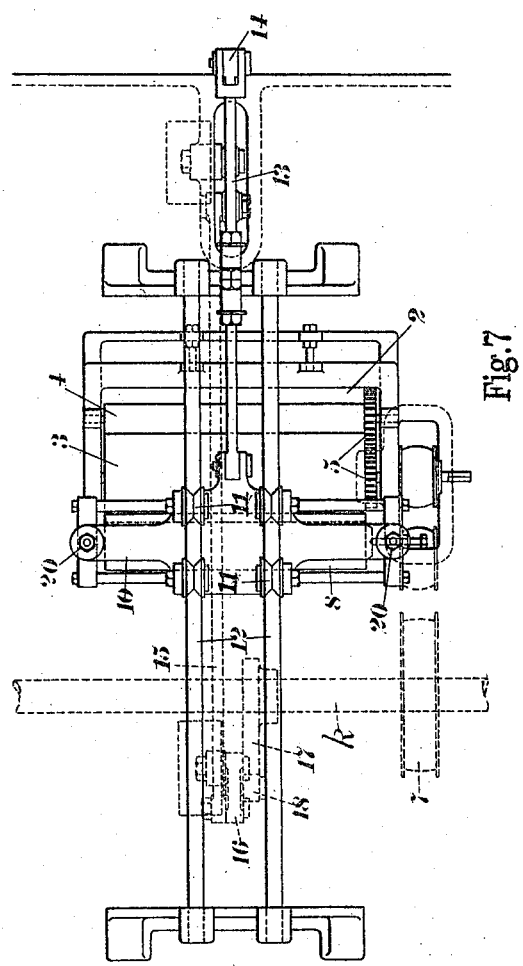

In the position shown in Figure 6 the transferring roller 8 is in contact with the roller 3, and receives therefrom a supply of adhesive material. When moved across the box it deposits adhesive on the front edge, the two ends, the rear edge and the portion of the lid adjacent to the rear edge. The stems 9 carrying the roller 8 permit a free vertical movement of the roller. Also the position of the roller is adjustable by the nuts 20. When the roller first comes into contact with the box it is caused to ride upwards over the front edge, in order that a pressure may be exerted by the roller on the box. (In the drawing at Figure 6 the roller 8 is shown rather too low for a box of the height illustrated.) After the return of the roller 8 to its initial position it remains there until during the next cycle another box is brought into position.

Figure 8:
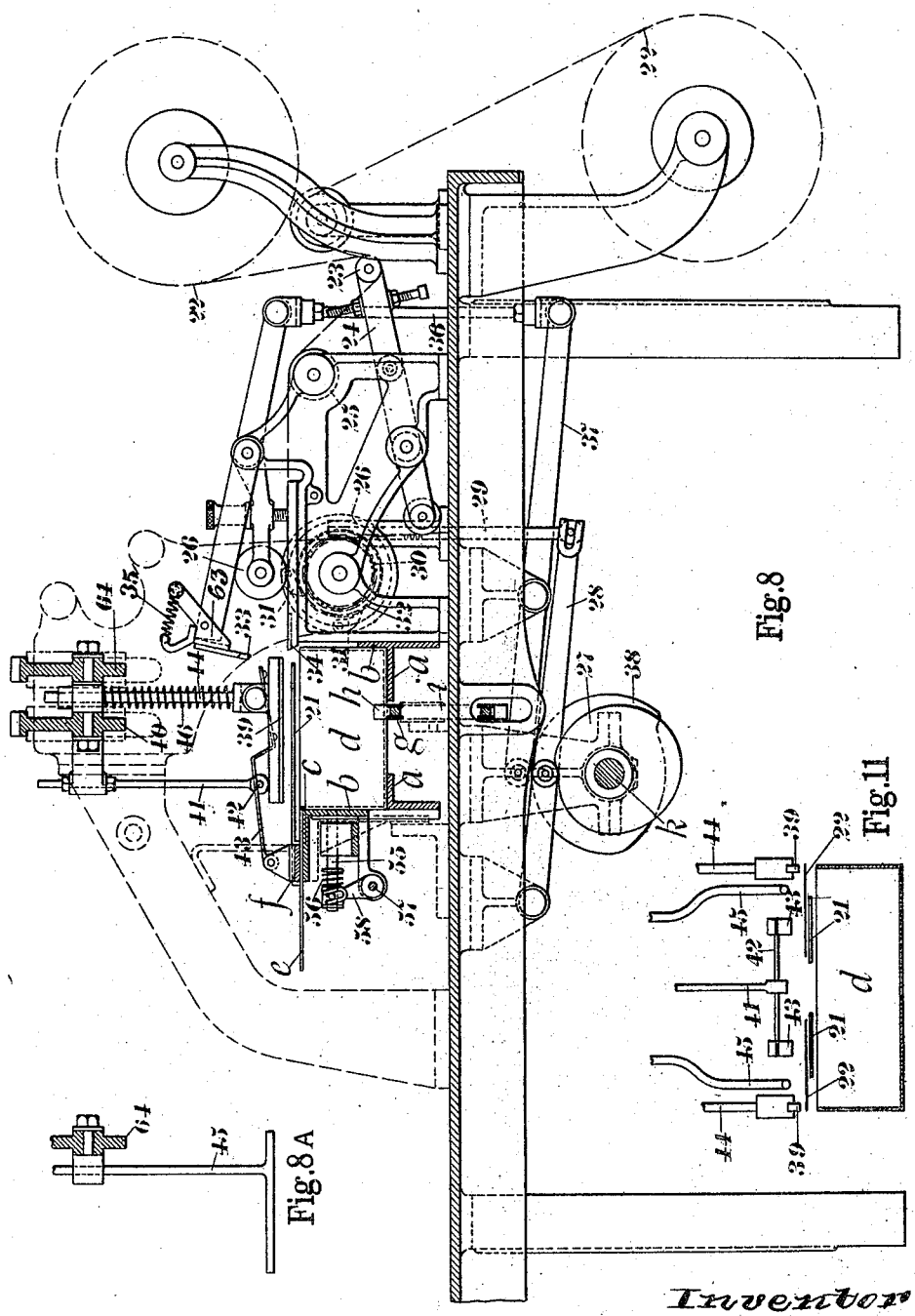
Figure 8 is a sectional end elevation, Figure 9 a front elevation, and Figure 10 a plan of the mechanism by which a pair of strips are applied simultaneously to the ends of the box.
Figure 9:
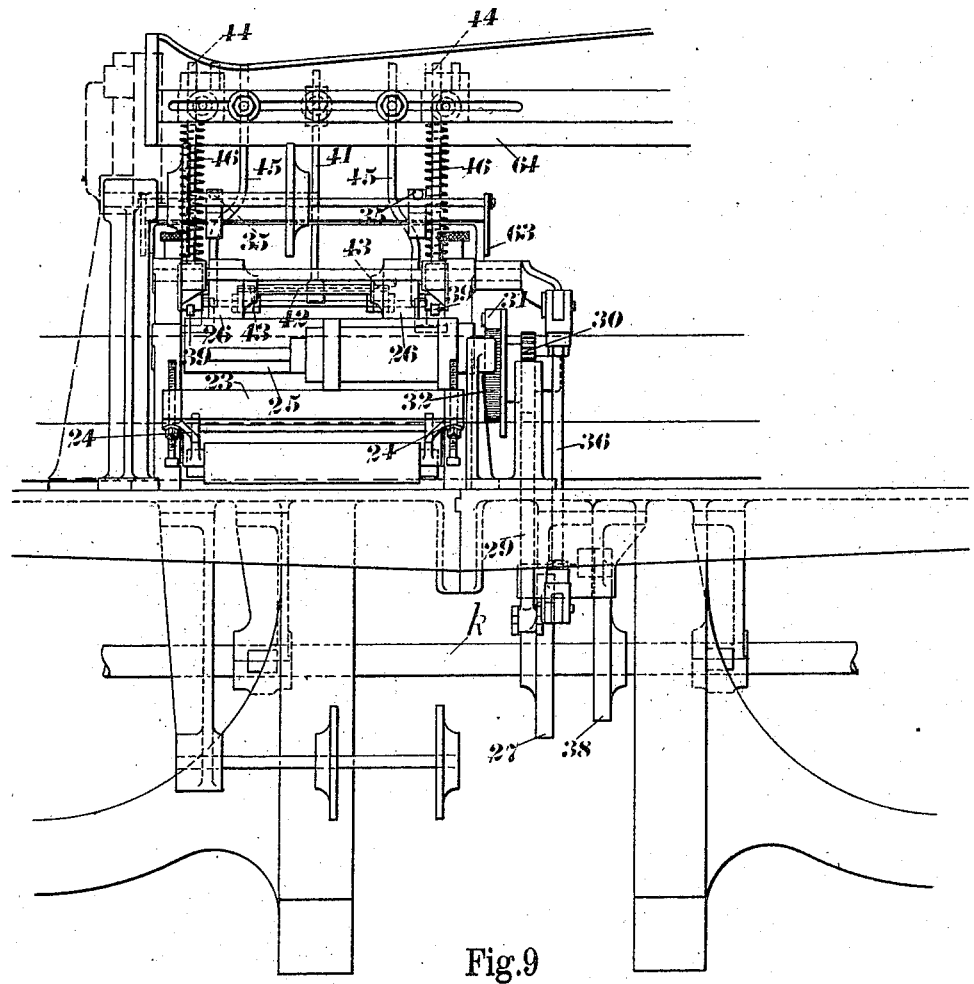

After the application of the adhesive the box is moved by the conveyor chain to the first lining position. Here paper strips are attached simultaneously to the upper edges of the two ends of the box. The mechanism for carrying out this operation is shown in Figures 8–10, and the manner of carrying out the operation is further illustrated by the supplementary diagram at Figure 11. In a convenient position over the box are secured a pair of strip supporting plates 21, and at the front of the machine are mounted two rolls of paper strip 22. The two strips are arranged side by side, and after passing under a tensioning roller 23 at one end of a partially balanced lever 24, and over a guide roller 25, they pass between a pair of feed rollers 26. The lower feed roller receives intermittent motion in one direction from a mechanism comprising a cam 27, lever 28 and rod 29 at the upper end of which is provided a rack engaging a toothed wheel 30. The latter transmits its motion through pawls 31 and ratchet wheel 32 to the lower roller, the amount of movement imparted to the roller in each action being sufficient to feed forward the paper strips to an extent equal to the width of the box. During the return of the rack the pawls 31 move idly over the ratchet 32. After the feeding operation the forward portions of the two strips are cut off by the movable shear blade 33 which coacts with the fixed shearing edge 34. Movement of the blade 33, which is carried by the pivoted frame 63 and is preferably hinged thereon under control of the spring 35, is effected by the rod 36, lever 37 and cam 38. After severance the paper strip portions to be attached to the ends of the box are temporarily supported by the plates 21. Attachment to the box is effected by pads 39 attached to a vertically movable longitudinal bar 40. On the same bar is attached a stem 41 fitted with a transverse portion 42 which holds up a pair of spring or weight actuated gripping pieces 43. When the bar 40 descends the part 42 allows each gripping piece 43 to advance on to the severed paper and to hold it on the corresponding supporting plate 21. Immediately afterwards the pads, which are over the end edges of the box press the paper strips into contact with the gummed edges of the box. The pads are carried on stems 44 which allow the bar 40 to continue its motion after the pads have been arrested by contact with the box. Springs 46 cause the pad to exert sufficient pressure on the box.

Alongside the bar 40 is another bar 64 carrying a pair of folding tools 45. These tools lie immediately behind the front pad 39 shown in Figure 8, and one of them is illustrated separately by Figure 8ª. At Figure 11 the severed strip portions are shown in the position occupied immediately prior to the action of the pads. While the paper portions are being held on the box by the pads, the tools 45 descend and cause the said portions to slide from beneath the gripping pieces into the required position within the box. Subsequently the bars 40 and 64 rise and return the pads, folding tools and grippers to the initial position.

From the first lining (or strip attachment) position, the box is moved to the second position in which a strip of paper is attached to the front edge of the box. The mechanism for carrying out this operation is shown in Figures 12 and 13, and is essentially the same as that above described. Description of this mechanism in detail is unnecessary as the reference numerals identify the parts with the corresponding parts and the description of the preceding mechanism. The supporting plate 21 is attached to the forward end of the part carrying the fixed cutting blade 34, and the paper is fed from the side of the machine opposite to that from which it is fed in the previous stage. The gripper (43) is not used in this or the succeeding stage, though it may be employed if found necessary. The pad 39 may be caused to press the forward edge of the paper on to the gummed forward edge of the box concurrently with or prior to the shearing of the strip by the blades 33, 34. Immediately afterwards the tool 45 presses the paper strip over the adjacent inner face of the box.

From the second lining position the box is moved to the third position where a strip is attached to the rear edge of the box or the adjacent portion of the lid. The mechanism for carrying out this operation is illustrated in Figures 14 and 15, and is essentially the same as the two already described. The paper is fed from the front of the machine as in the first stage, and the forward end is supported on the plate 21 which is attached to the part carrying the blade 34. By means of the pad 39 the forward end of the strip is (in the arrangement shown) pressed on to the portion of the box lid adjacent to the rear edge of the box. The gripper is not ordinarily required in this stage. Also the folding tool may usually be omitted at this stage. Both gripper and folding tool may, however, be provided if required.

From the last position the box is conveyed to the end of the machine whence it is removed for storage or transferred to a labelling or other machine.

Figure 16:
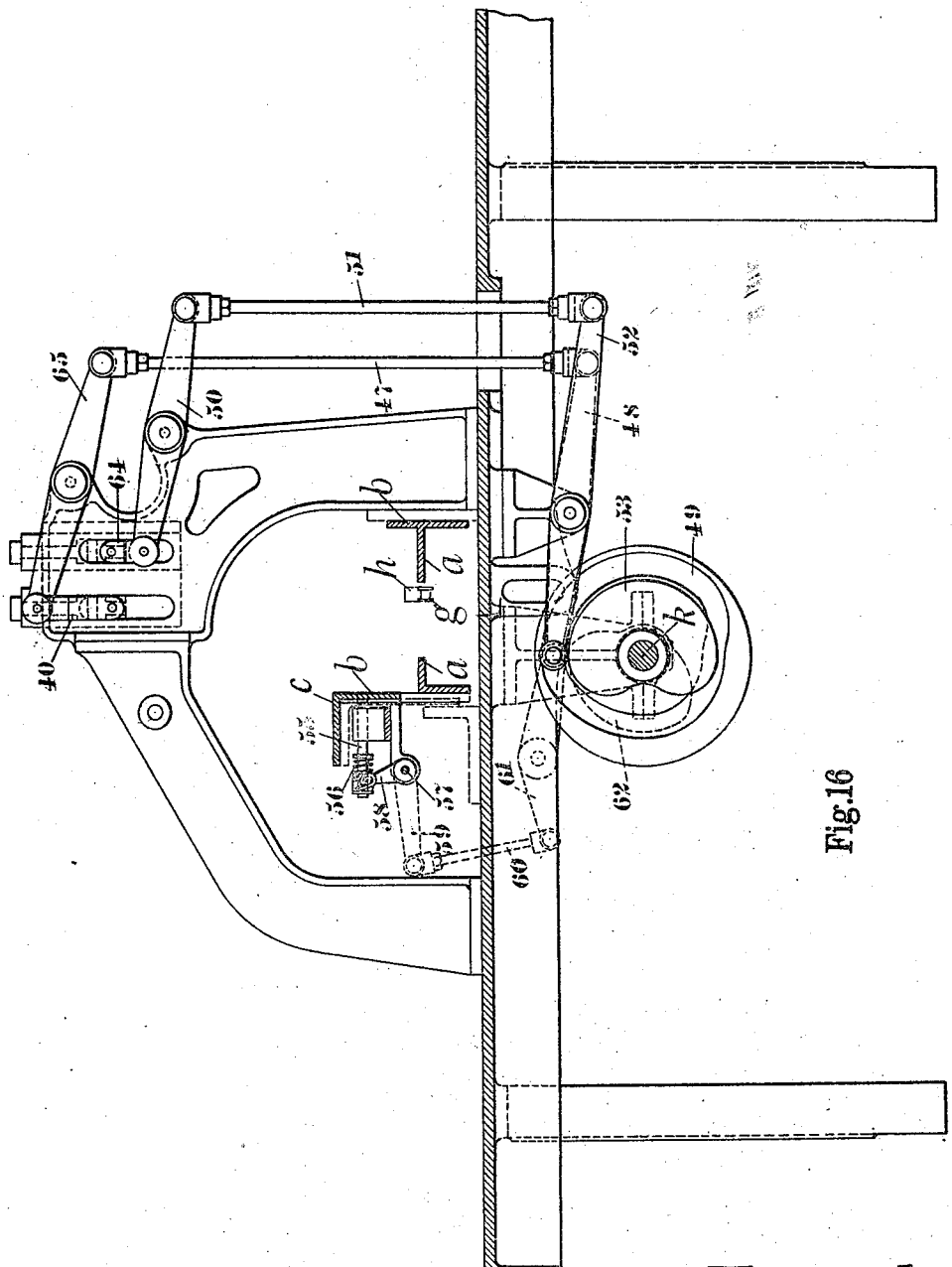
Figure 16 is a sectional end elevation showing the mechanism for actuating the two longitudinal bars carrying the pressure pads and folding tools used in the strip attaching operations. This view also shows the mode of actuation of the locking mechanism whereby the boxes are secured in each of the operative positions.

Actuation of the bars 40, 64 which carry all the pads and folding tools, is effected by the means shown in Figure 16. To each end of the bar 40 is attached a lever 65, and this is connected by a link or rod 47 to a lever 48 actuated by a grooved cam 49 on the shaft $k$. Likewise a lever 50 at each end of the bar 64 is connected by a rod 51 to a lever 52 actuated by a peripheral cam 53. As it is desirable that the bar 40 carrying the pads should be given a positive motion in both the downward or upward directions the portions of the cam 49 which engages a roller at one end of the lever 48 is made in the form of a groove. It is usually unnecessary to impart a positive motion to the bar 64 in the downward direction, and the operative surface of the cam 53 is therefore provided on its periphery. It will be understood that two cams and lever mechanisms are employed for each bar, these being arranged at the opposite ends of the bars.

At each of the operative positions it is desirable to secure the boxes against accidental movement on their supports, and for this purpose plungers 54, 55 are arranged at each of such positions. The plungers are arranged in one of the vertical sides of the longitudinal channel along which the boxes move. Each of the plungers 54 can be caused to project beyond the side of the channel and act as a stop or abutment for the front end of the box. Each of the other plungers 55 is actuated through a spring 56, and is caused to press against the adjacent side of the box, thereby causing the box to be held firmly against the opposite side of the channel. The plungers are all actuated from a rocking shaft 57 through levers 58, the shaft being operated at proper intervals by a lever 59, rod 60 and lever 61 from a cam 62 on the shaft $k$.

Figure 1A:
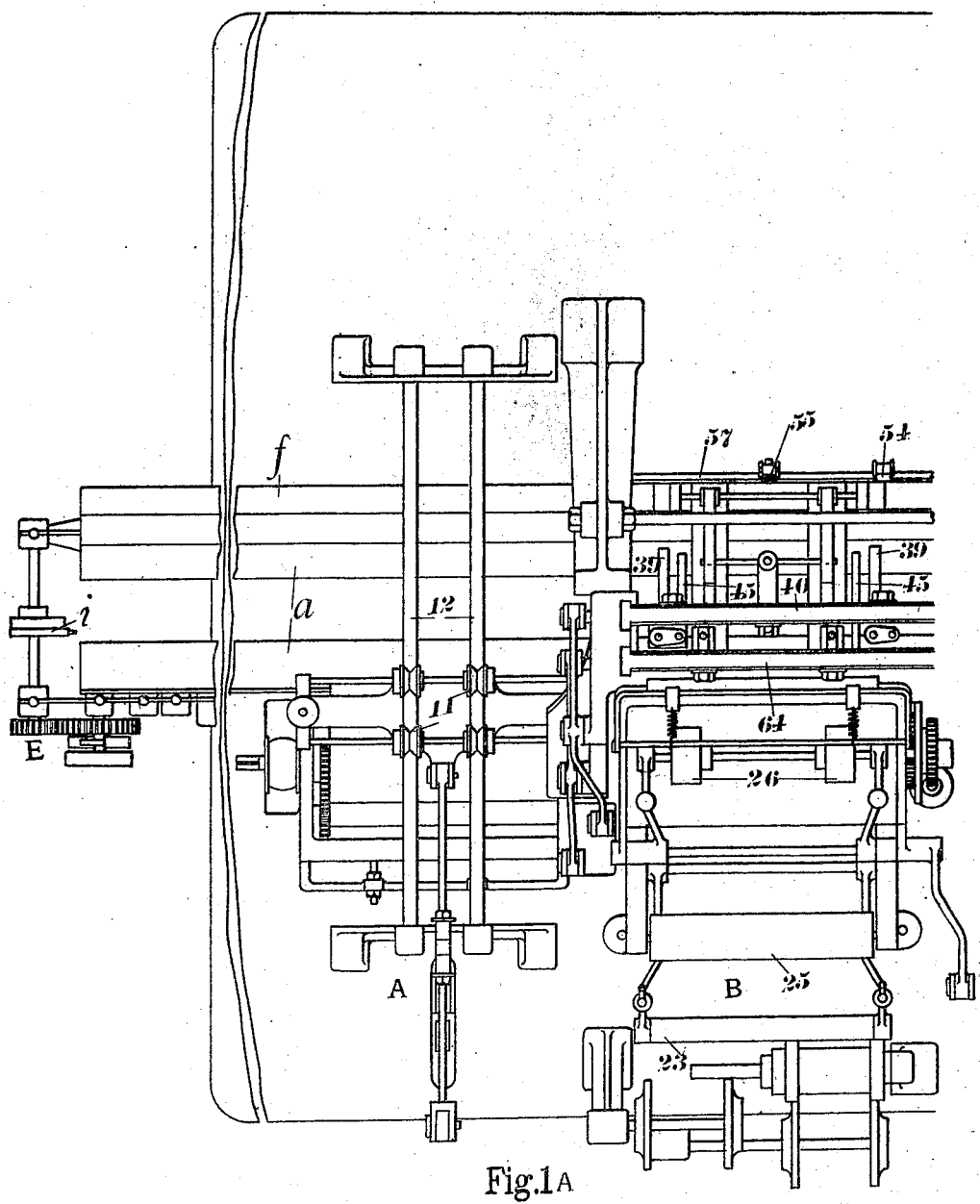

It will be understood that, although in the foregoing the lining of a single box has been described, a succession of boxes are acted on simultaneously. When the first box reaches the last stage, there is a box in each of the preceding stages, and subsequently each operation of the machine performs an operation on each of four successive boxes. The assembly of the separate mechanisms in a complete machine is shown in the general arrangement plan at Figure 1. The mechanism for applying adhesive occupies the position indicated by A. Alongside this is arranged at B the mechanism for attaching two strips simultaneously to the ends of each box. Next in order is the mechanism indicated by C for attaching a strip to the front edge of the box, and finally the mechanism indicated by D for attaching a strip to the rear edge or lid. The chain actuating mechanism is arranged at E, and the chain tensioning device at F. The gearing for driving the main longitudinal shaft $k$ is arranged at G.

The invention is not limited to the particular mechanical details herein described as these may be varied to suit different requirements.

Having thus described my invention what I claim as new and desire to secure by Letters Patent is:

1. In machines for lining wood and like boxes with strips of paper and like material, means for applying adhesive to the upper edges of a box, means whereby strips are applied to a plurality of boxes simultaneously, and intermittently operated means whereby each of a succession of boxes is moved first to a position in which the adhesive is applied and subsequently to each of the positions in which the strips are applied.

2. In machines for lining wood and like boxes with strips of paper and like material, means for applying adhesive to the upper edges of a box, means whereby strips are applied to a plurality of boxes simultaneously, and intermittently operated means whereby each of a succession of boxes is moved first to a position in which the adhesive is applied and subsequently to each of the positions in which the strips are applied.

3. In machines for lining wood and like boxes with strips of paper and like material, means for applying adhesive to the upper edges of a box, means whereby strips are applied to a plurality of boxes simultaneously, and intermittently operated means whereby each of a succession of boxes is moved first to a position in which the adhesive is applied and subsequently to each of the positions in which the strips are applied, means for feeding each strip into position from a roll, means for severing the strips into pieces of proper length, means for supporting the severed portions, means for pressing the strip portions onto the adhesive material on the box, and additional means for folding the strip portions into position within the boxes.

4. In a box lining machine as claimed in claim 1, the combination comprising a conveyor chain, box engaging projections on said chain, a reciprocatory rack, and means including a ratchet and a pawl device for imparting unidirectional intermittent motion from the rack to the chain.

5. In box lining machines as claimed in claim 2, the combination comprising a conveyor chain, box engaging projections on said chain, a reciprocatory rack, and means including a ratchet and pawl device for imparting unidirectional intermittent motion from the rack to the chain, substantially as described.

6. In box lining machines as claimed in claim 1, the combination comprising a tank containing adhesive material, a roller in said bath, a transferring roller, a carriage for the transferring roller movable on horizontal guides, and cam actuated mechanism for reciprocating the carriage and feed roller on the guides, substantially as described.

7. In box lining machines as claimed in claim 3, the combination comprising a tank containing adhesive material, a roller in said tank, a transferring roller, a carriage for the transferring roller movable on horizontal guides, and cam actuated mechanism for reciprocating the carriage and feed roller on the guides, substantially as described.

8. In box lining machines as claimed in claim 1, the combination comprising strip feeding rollers, a cam operated rack and pinion and ratchet and pawl device for imparting unidirectional intermittent motion to the said rollers, a cam operated shears, and a cam operated pressure pad, substantially as described.

9. In box lining machines as claimed in claim 1, the combination comprising a tank containing adhesive material, a roller in said tank, a transferring roller, a carriage for the transferring roller movable on horizontal guides, and cam actuated mechanism for reciprocating the carriage and feed roller on the guides, a pressure pad for acting on the strips, and a strip folding tool.

10. In box lining machines as claimed in claim 1, the combination of a plurality of pressure pads for the strips, strip folding tools, a pair of longitudinal vertically movable bars respectively carrying all the pressure pads and folding tools required in a plurality of successive strip attaching operations, and cam and lever mechanisms for independently actuating the said bars, substantially as described.

11. In box lining machines as claimed in claim 2, the combination of a plurality of pressure pads for the strips, strip folding tools, a pair of longitudinal vertically movable bars respectively carrying all the pressure pads and folding tools required in a plurality of successive strip attaching operations, and cam and lever mechanisms for independently actuating the said bars, substantially as described.

12. In box-lining machines as claimed in claim 1, the combination comprising strip feeding rollers, a cam operated rack and pinion and ratchet and pawl device for imparting unidirectional intermittent motion to said rollers, cam operated shears, cam operated pressure pads for the strips, a pair of longitudinal vertically movable bars respectively carrying the pressure pads, and strip folding tools operating in a plurality of successive strip attaching operations, and cam and lever mechanism for independently actuating the said bars.

13. In box lining machines having the feature claimed in claim 1, the combination comprising a pair of plungers one of which serves as an abutment for the boxes and the other for pressing against one side of the box for securing the same, and cam and lever mechanism for actuating the plungers, substantially as described.

In testimony whereof I have signed my name to this specification.

HENRY HACKETT.